Nov. 16, 1948.　　　　　　　　E. L. PAGE　　　　　　　2,454,084
FRICTION DISK BRAKE FOR AUTOMOBILES AND THE LIKE
Filed Sept. 13, 1946　　　　　　　　　　　　　　　　2 Sheets-Sheet 1
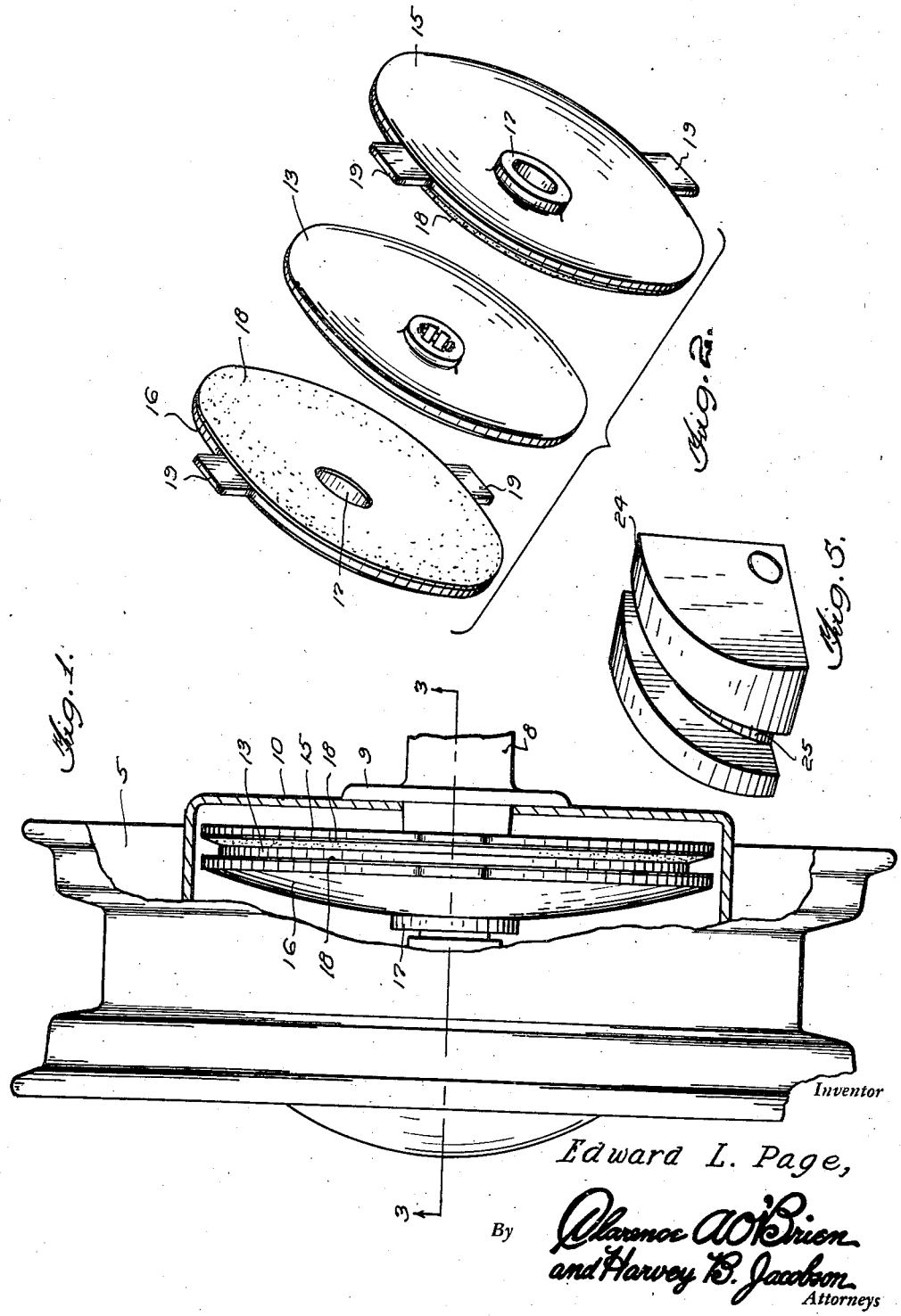
Inventor
Edward L. Page,
By Clarence A. O'Brien
and Harvey B. Jacobson
Attorneys Nov. 16, 1948.   E. L. PAGE   2,454,084
FRICTION DISK BRAKE FOR AUTOMOBILES AND THE LIKE
Filed Sept. 13, 1946   2 Sheets-Sheet 2
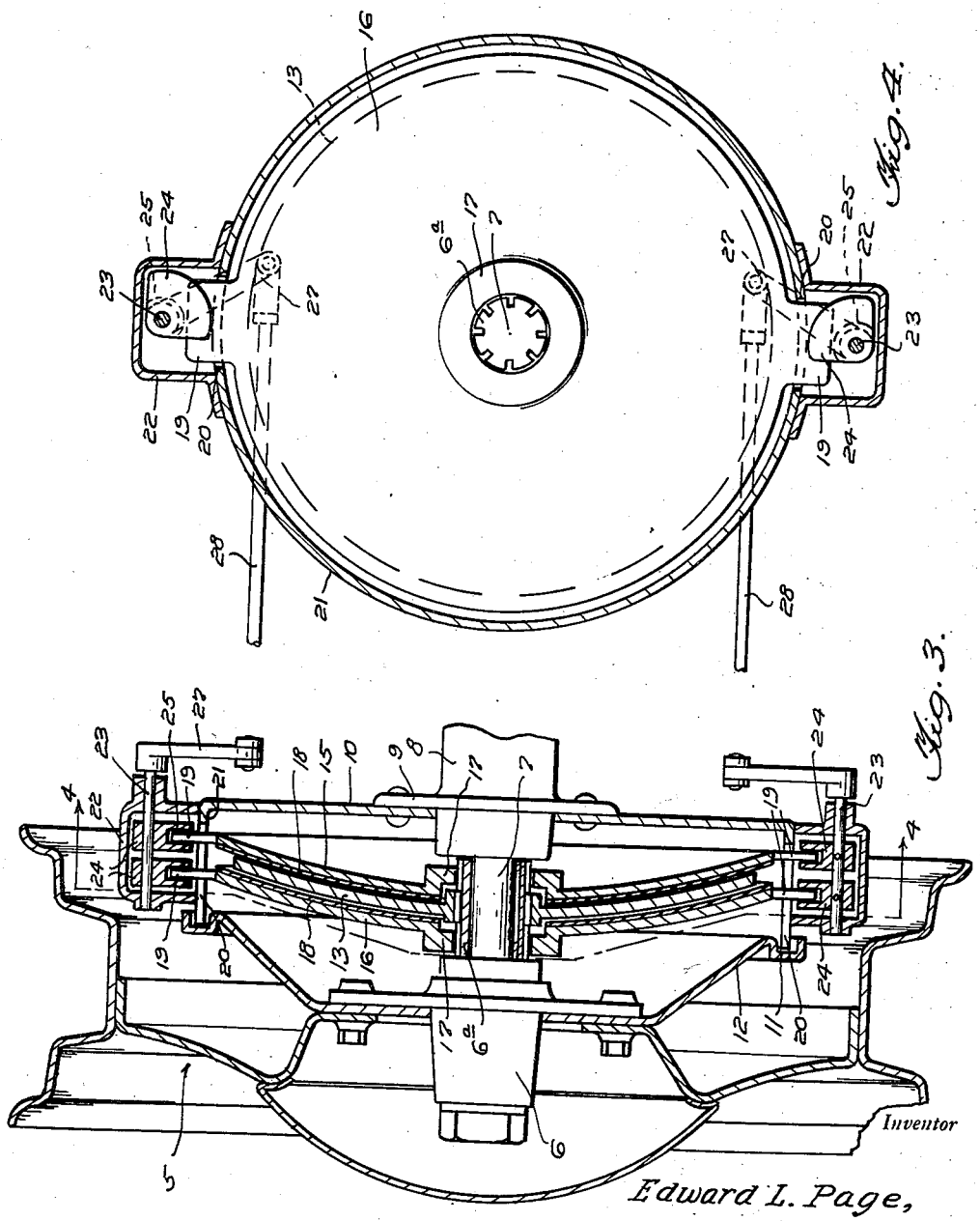
Inventor
Edward L. Page,
By Clarence A. O'Brien
and Harvey B. Jacobson
Attorneys Patented Nov. 16, 1948

2,454,084

UNITED STATES PATENT OFFICE 2,454,084

FRICTION DISK BRAKE FOR AUTOMOBILES AND THE LIKE

Edward L. Page, Flint, Mich.

Application September 13, 1946, Serial No. 696,854

2 Claims. (Cl. 188—72)

The present invention relates to new and useful improvements in brakes for use under any conditions where a brake is required, and designed especially for use upon automobiles and other motor driven vehicles.

More specifically, the invention embodies the provision of a rotatable disc secured to the vehicle wheel and non-rotatable friction discs movable generally axially into and out of braking contact with the opposite sides of the rotating disc.

An important object of the present invention is to provide a brake of this character which embodies exceptionally large braking surfaces and other braking characteristics which are more effective than the conventional brake of the drum and shoe type.

Another object of the invention is to provide a brake mechanism which eliminates the use of springs on the inside of the brake housing and which involves the use or no working parts to get out of order or adjustments.

A still further object is to provide a device of this character of simple and practical construction, which is efficient and reliable in use, relatively inexpensive to manufacture and install in operative position and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is an edge elevational view of a vehicle wheel with parts broken away and shown in section Figure 2 is a perspective view of the rotating and non-rotating friction brake disc Figure 3 is a sectional view taken on a line 3—3 of Figure 1

Figure 4 is a sectional view taken on a line 4—4 of Figure 3, and

Figure 5 is an enlarged perspective view of the brake disc applying and releasing cam.

Referring now to the drawings in detail wherein for the purpose of illustration I have disclosed a preferred embodiment of the invention, the numeral 5 designates a vehicle wheel including a hub 6 secured to an axle 7. The axle is enclosed in a housing 8 provided with a flange 9 to which an annular brake housing 10 is secured, one side of the brake housing being open and with its open edge projecting into a channel 11 formed at the peripheral edge of the plate 12 secured to the hub 6 of the wheel, the plate 12 thus closing the open side of the housing 10.

A rotary brake disc 13 of concavo-convex formation is splined to a hub sleeve 6a fixed to the hub 6. Inner and outer stationary friction discs 15 and 16, likewise of concavo-convex formation are positioned at opposite sides of the disc 13, the central portion of the discs 15 and 16 being formed with bearings 17 in which the hub sleeve 6a is rotatable, the discs 15 and 16 being slidable relative to the disc 13. The opposed inner surfaces of the stationary discs 15 and 16 are provided with brake lining material 18 of suitable construction.

The stationary discs 15 and 16 are provided at diametrically opposite edges with radially extending tongues 19 slidably received in transverse slots 20 of the flange 21 of the brake housing 10, the tongues 19 projecting radially outwardly of the flange 21.

Cam housings 22 are secured to the periphery of the flange 21 enclosing the outer ends of the tongues 19, the opposite side walls of the housing 22 having a shaft 23 journaled therein.

A pair of cams 24 are secured to the shaft 23 and are positioned radially outwardly with respect to the ends of the tongues 19, the cams being constructed in the form of a segment of a circle and formed with a laterally curved groove 25 in its curved edge receiving the ends of the tongues of the stationary discs for sliding the tongues 19 toward each other upon a rotation of the shaft 23 in one direction to thus move the discs 15 and 16 into brake applying contact with the rotating disc 13 and for sliding the tongues away from each other upon a rotation of the shaft in an opposite direction to release the discs.

An arm 27 is attached to one end of the shaft 23 and to which one end of a brake rod 28 is pivotally attached for operation in the usual manner by a brake pedal (not shown).

I claim:

1. A brake for a rotating member comprising a disc secured to said member for rotation therewith, a pair of discs slidably mounted on said member at opposite sides of said rotatable disc, a stationary housing enclosing said discs and having a slot positioned transversely of the edges of the discs, tongues on the slidable discs projecting through said slot to secure the sliding discs against rotation, and cams rockably mounted on said housing and engaging the tongues to move said pair of discs into and out of braking contact with said rotatable disc.

2. A vehicle brake comprising a rotating concavo-convex disc, a pair of stationary concavo-convex disks slidably positioned at opposite sides of the rotating disc, a stationary housing for the discs having a slot extending transversely of the edges of the discs, tongues on the edges of the stationary discs sliding in said slot, a shaft journaled on the housing, and cams secured to the shaft and engaging the tongues to move the stationary discs into and out of braking contact with the rotating disc.

EDWARD L. PAGE.

REFERENCES CITED

The following references are of record in the file of this patent:

UNITED STATES PATENTS

| Number | Name | Date |
|---|---|---|
| 1,506,930 | Haselmaier | Sept. 2, 1924 |
| 1,824,332 | Davidson | Sept. 22, 1931 |
| 1,989,179 | Versluis | Jan. 29, 1935 |